July 30, 1935.   H. J. WOOCK   2,009,599
METHOD OF APPLYING TREAD RUBBER TO TIRES
Original Filed June 6, 1932   6 Sheets-Sheet 1

INVENTOR
H. J. Woock
BY
ATTORNEY

July 30, 1935.　　　　H. J. WOOCK　　　　2,009,599
METHOD OF APPLYING TREAD RUBBER TO TIRES
Original Filed June 6, 1932　　6 Sheets-Sheet 2

INVENTOR
H. J. Woock
BY
ATTORNEY

July 30, 1935.  H. J. WOOCK  2,009,599
METHOD OF APPLYING TREAD RUBBER TO TIRES
Original Filed June 6, 1932  6 Sheets-Sheet 3
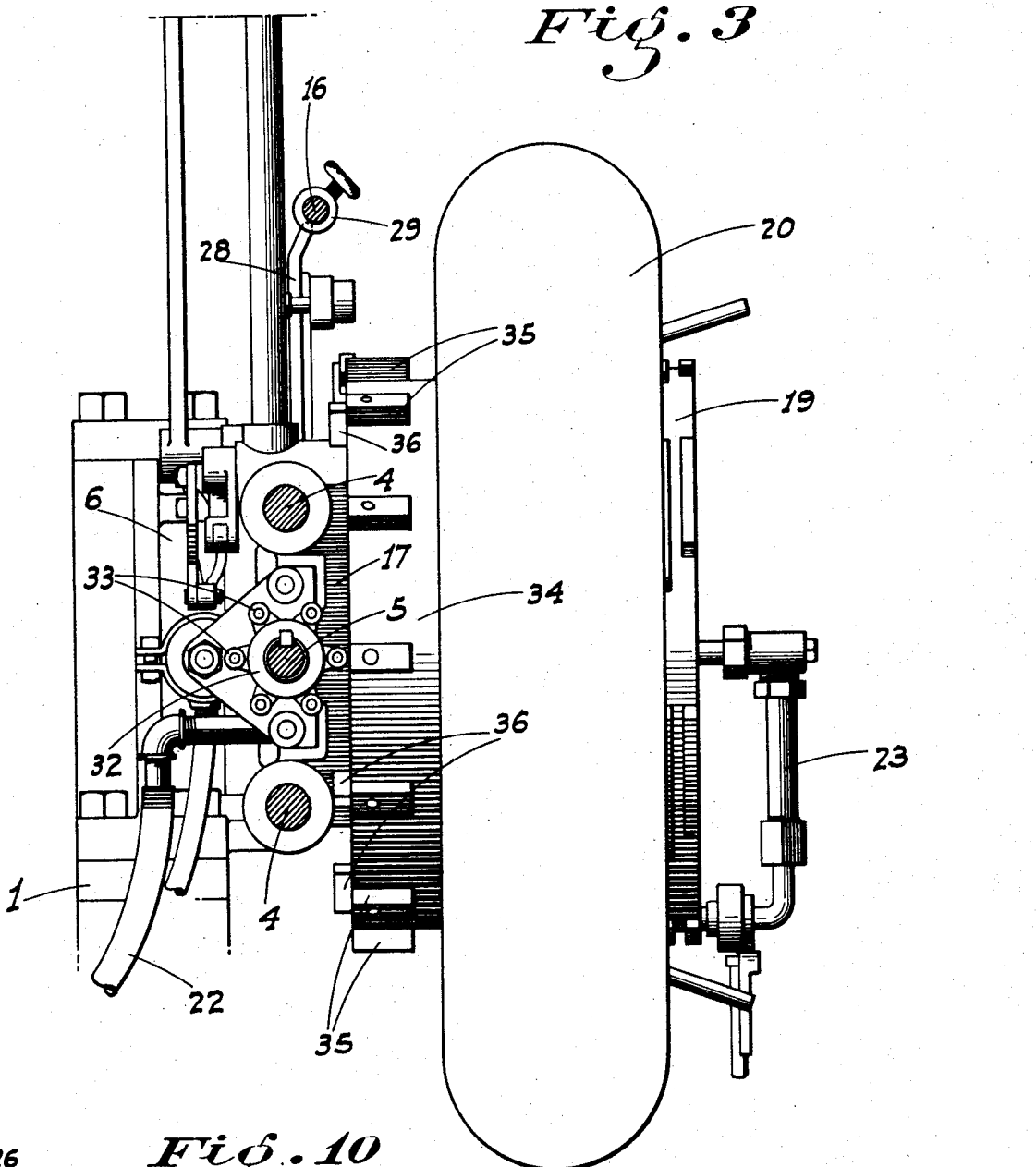
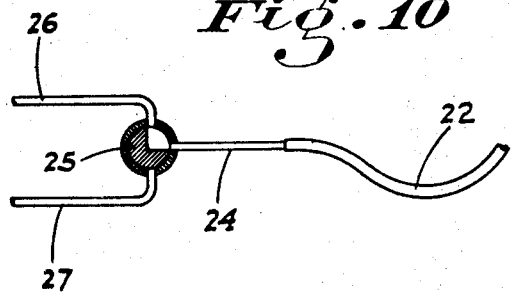
INVENTOR
*H. J. Woock*
BY
ATTORNEY

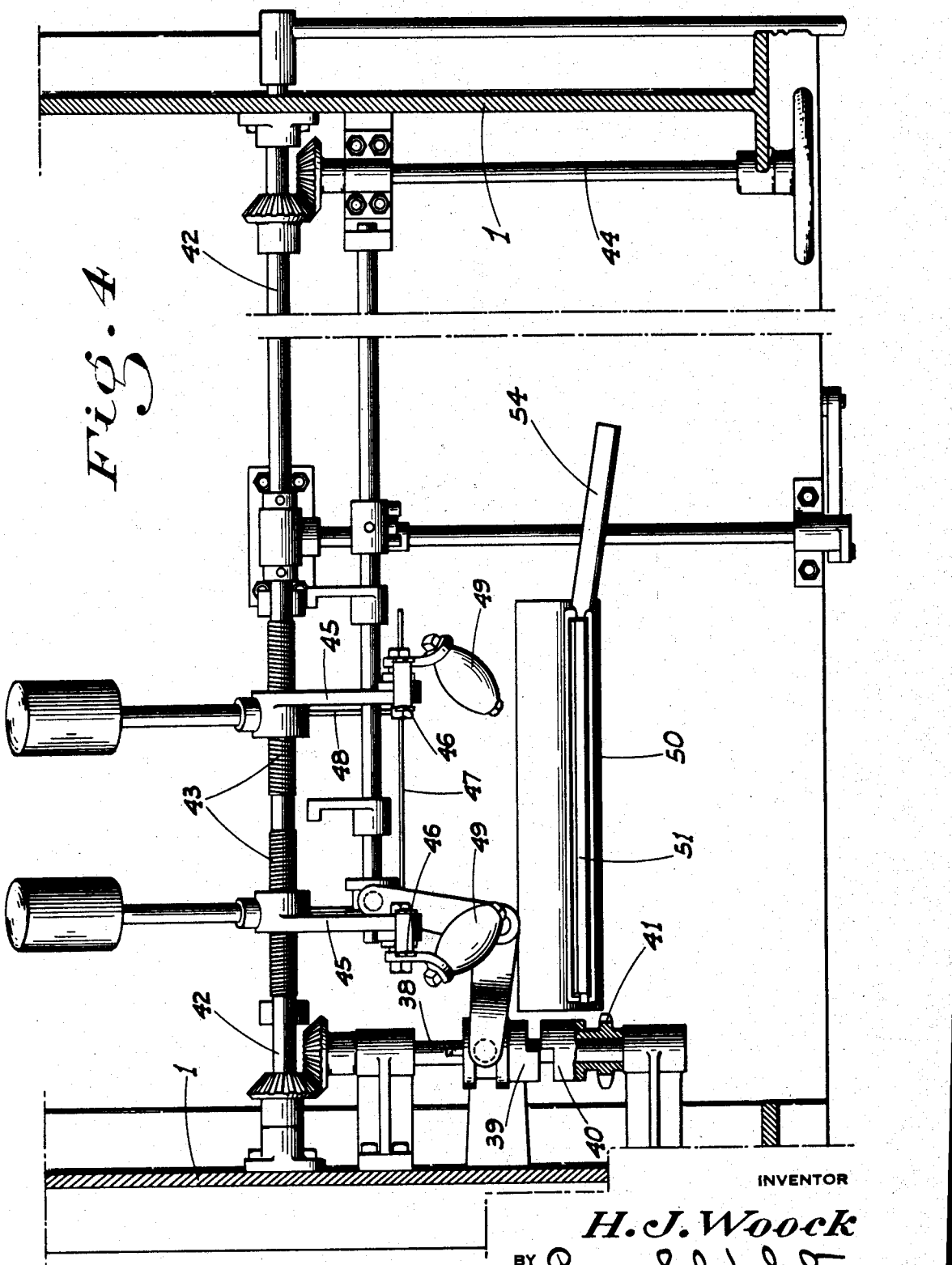

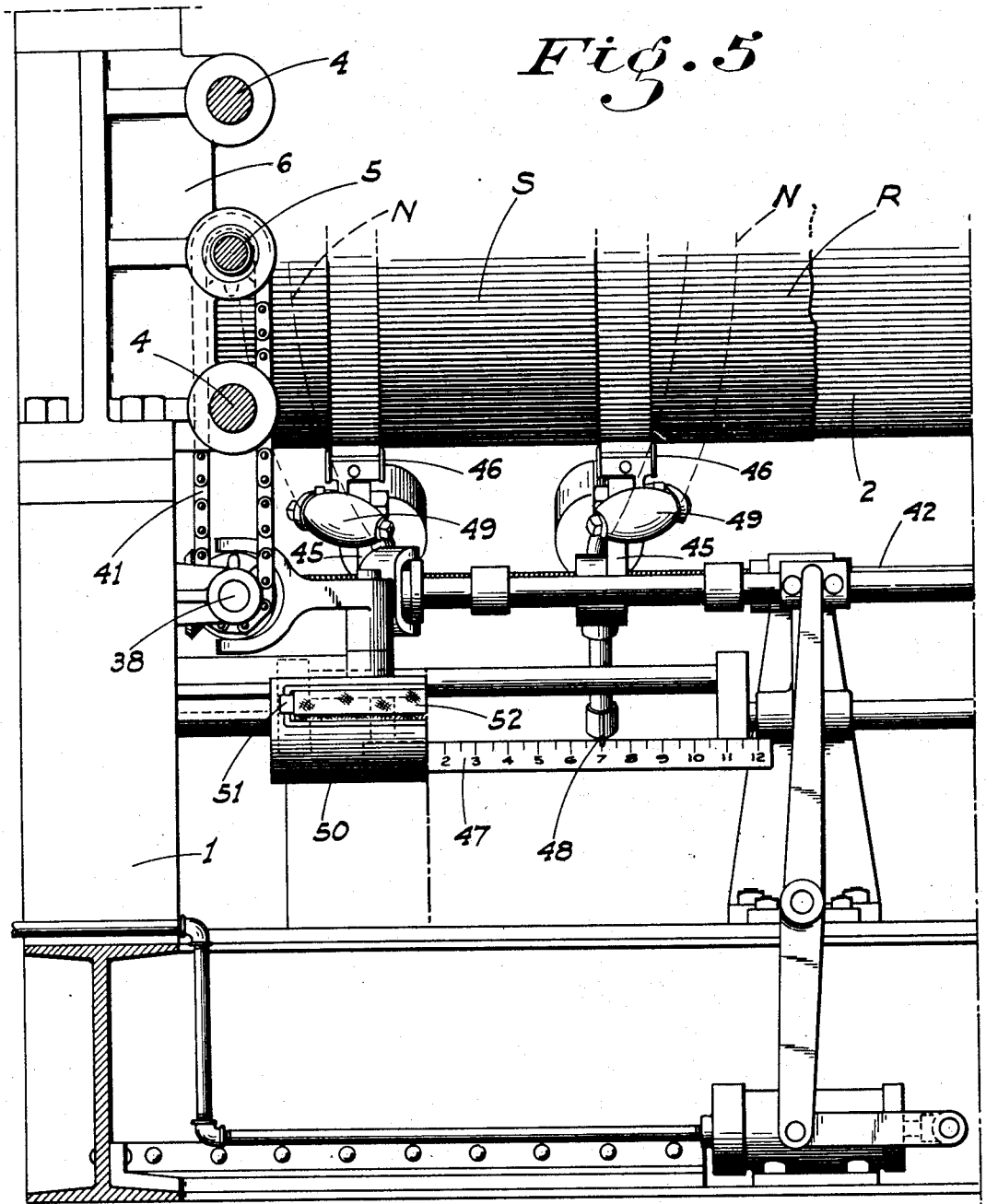

July 30, 1935. H. J. WOOCK 2,009,599
METHOD OF APPLYING TREAD RUBBER TO TIRES
Original Filed June 6, 1932 6 Sheets-Sheet 6
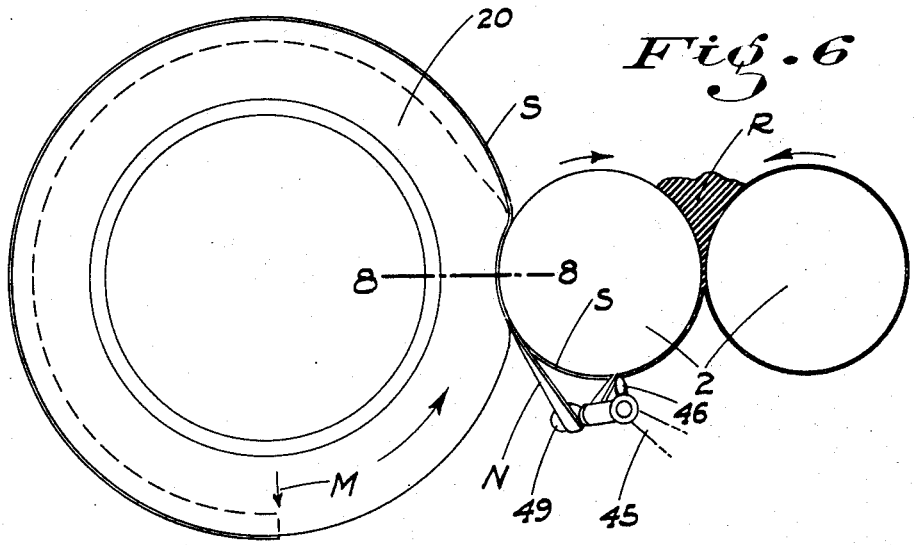
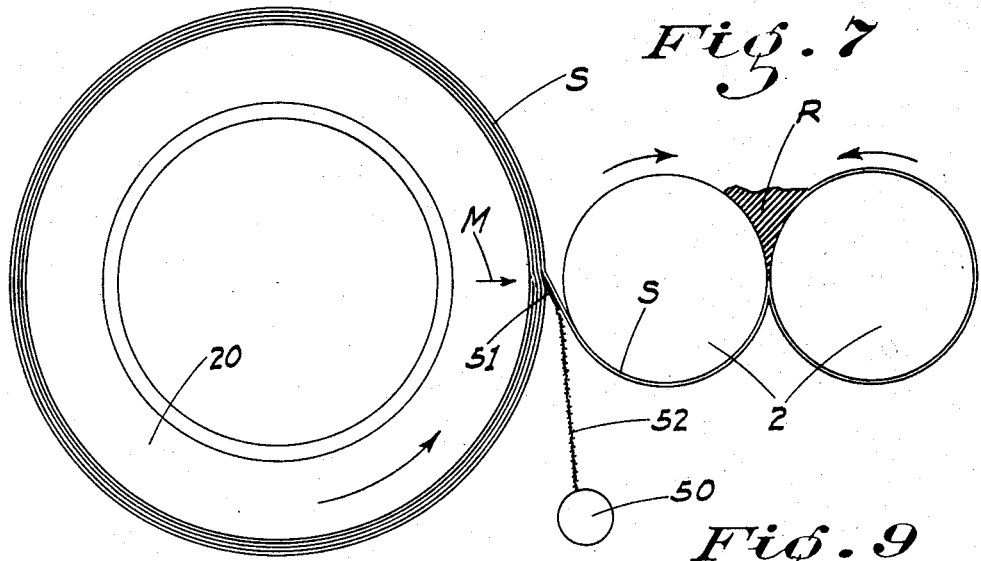
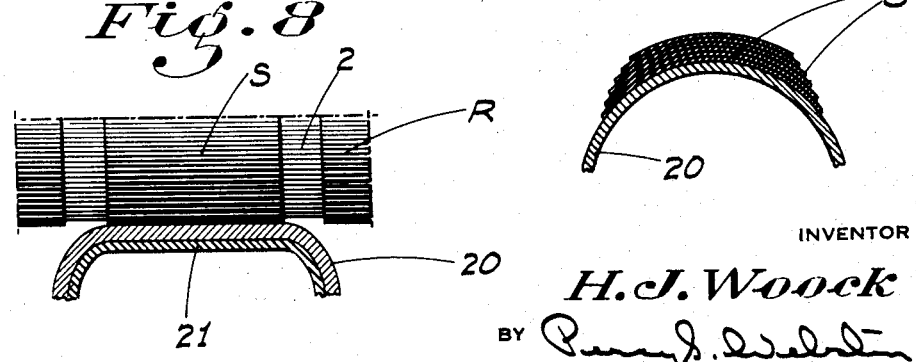
INVENTOR
*H. J. Woock*
BY
ATTORNEY Patented July 30, 1935

2,009,599

UNITED STATES PATENT OFFICE 2,009,599

METHOD OF APPLYING TREAD RUBBER TO TIRES

Herbert J. Woock, Lodi, Calif., assignor to Super Mold Corporation, Lodi, Calif., a corporation of Nevada Original application June 6, 1932, Serial No. 615,641. Divided and this application March 22, 1933, Serial No. 662,053

17 Claims. (Cl. 154—14)

This invention relates to the tire retreading art and is a divisional application of my co-pending application, Serial No. 615,641, filed June 6, 1932. This invention has for its main object the provision of a novel method for applying bulk retread rubber to the tire in the form of a number of continuous layers or wrappings so as to build up the desired tread base on the tire casing corresponding to that had with the use of camelback and eliminating the need of the same, and the objectionable features incident to its use.

In connection with thus applying the rubber it is necessary, in order to obtain an efficient result, that considerable pressure be applied to obtain a good adhesion of the rubber with the tire, that the rubber strip shall adhere with equal force throughout its area to the tire regardless of the rounded contour of the latter; that the pressure shall be maintained substantially constant as the diameter of the tire is increased with the superimposed wrappings of rubber thereon; that the width of the rubber strip shall be gradually lessened as the tread is built up so that the cross sectional form of the new tread base when the rubber is completely applied approximates that of the finished tread. Other objects of this invention therefore are to provide novel methods for obtaining the above desired ends and in a speedy and efficient yet inexpensive manner.

These objects are preferably carried out by means of the machine of the co-pending application, the essential features of which are shown in the accompanying drawings to illustrate my method.

In the drawings similar characters of reference indicate corresponding parts in the several views:

Fig. 3 is a sectional view on the line 3—3 of Fig. 2.

Fig. 4 is an enlarged fragmentary top plan view showing the strip width gauging and cutting mechanism, with the rolls removed.

Fig. 5 is a front view of the same.

Fig. 6 is a diagram showing the application of the rubber about the tire.

Fig. 7 is a similar view showing the step of stopping the wrapping of the rubber about the tire.

Fig. 8 is an enlarged fragmentary plan on the line 8—8 of Fig. 6 showing the tire compressed or flattened against the mill rod.

Fig. 9 is a fragmentary cross section of a tire with the wrappings of tread rubber thereon.

Fig. 10 is a diagram of the essential features of the compressed air control system for the tire.

Figure 1:
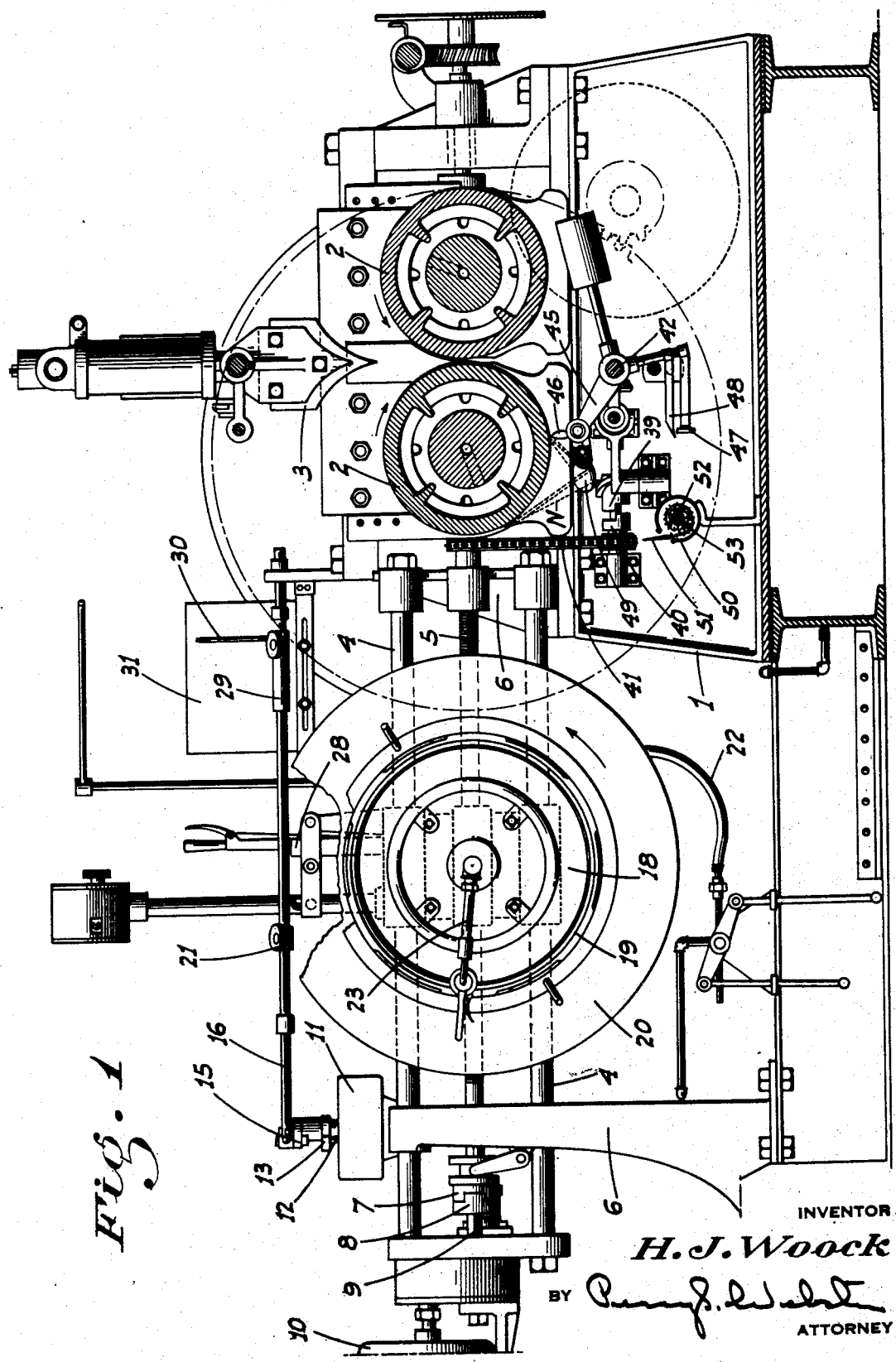
Fig. 1 is a side view of the machine with a tire to be retreaded being advanced toward the mill, the latter being in section.
Figure 2:
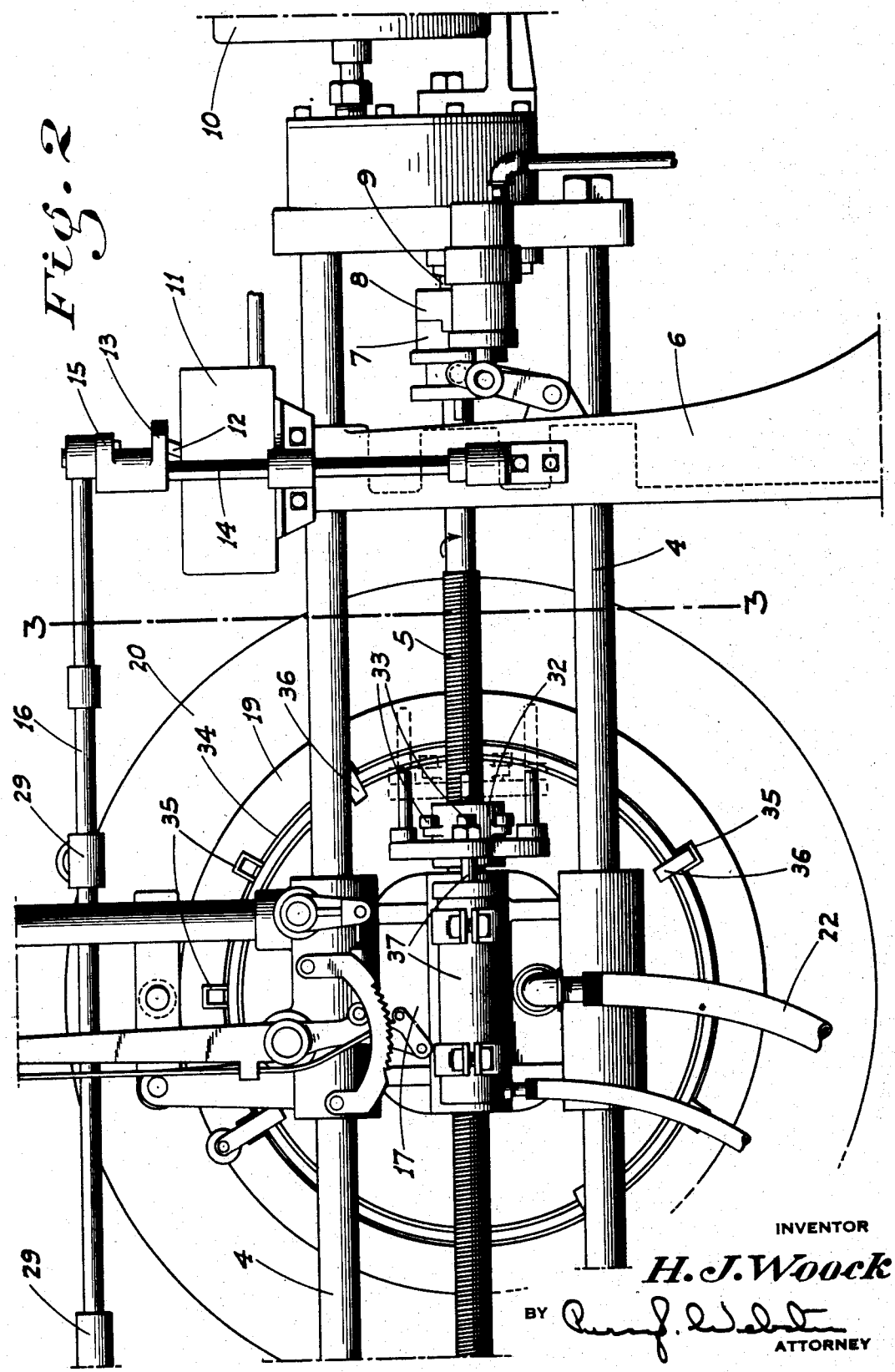
Fig. 2 is a fragmentary back view of the tire supporting and advancing structure.

Referring now more particularly to the characters of reference on the drawings, the numeral 1 denotes the side frames of the mill in connection with which the horizontally disposed rolls 2 are mounted. The rolls are hollow and are heated by steam in any suitable manner and are driven so that their upper surfaces turn toward each other. The rolls are long enough so that the rubber not being actually used at the moment can be rolled while the other rubber is being applied to the tire in a manner set forth later.

Gauge and trimming plates 3 spaced lengthwise of the rolls and disposed toward one end of the same are mounted above the rolls for vertical and horizontal adjustment and determine the width of the cushion strip to be applied to the tire. Said plates being near one end of the rolls leave the major portion of the latter clear for rolling the tread rubber stock to be used after the cushion stock has been applied.

Projecting horizontally from the front left hand frame 1 (or the one on the same side as that adjacent the above described trimming plates) are fixed upper and lower guide bars 4, between which and parallel thereto is a screw shaft 5. The bars and shaft at their opposite ends are supported by suitable standards 6. The shaft 5 at its end opposite the mill has a sliding clutch element 7 keyed thereon normally engaging a similar element 8 fixed on the adjacent end of a shaft 9 which is connected by reduction gearing with a reversible electric motor 10.

The circuit to the motor is controlled from a switch box 11 mounted on the standard 6 furthest from the mill and having a throw arm 12 projecting from the top. This arm is engaged by a member 13 projecting radially from a vertical shaft 14 supported in connection with the standard and switch box. An arm 15 projects radially from the upper end of this shaft and is connected to a control rod 16 which extends parallel to and above the upper bar 4 and extends as far as the mill.

The bars 4 slidably support a cross head 17 through which the shaft 5 is threaded, so that with the rotation of said shaft one way or the other the cross head will be moved along the bars in corresponding direction. The switch and the threading of the shaft are arranged so that when the switch arm is thrown away from the mill the motor and shaft are turning so that the cross head will be moved toward the mill, and vice versa.

Turnably supported from the cross head on the same side as the rolls is a cylindrical chuck device 18 adapted for detachable clamping engagement with a rim 19 on which the tire 20 to be retreaded is mounted; said tire having a flexible pressure bag 21 therein. This bag is maintained under suitable and adjustable air pressure while mounted on the rim and chuck by a flexible air conduit 22 connected to the back of the cross head and communicating with a passage leading through the chuck and which in turn is connected to a conduit 23 detachably coupled to the exposed valve stem of the tire.

The conduit 22 is connected by a pipe 24 to one port of a three-way manually controlled valve 25. Another port of the valve is connected to a pipe 26 in which a supply of compressed air at a predetermined pressure is maintained while the third port of the valve is connected to a pipe 27 in which a supply of air at a predetermined but different pressure is maintained. The valve is arranged so that the pipe 24 may be placed in communication with the pipes 26 and 27 selectively or shut off entirely.

A rigid finger 28 projects upwardly from the cross head to adjacent the rod 16 so as to engage either one or the other of a pair of stop collars 29 adjustably mounted on said rod. One collar is positioned so that the rod will be shifted back to throw the switch arm 12 to a neutral position after the tire has been retracted from the rolls a predetermined distance with the operation of the motor in a corresponding direction. The other collar is positioned so that the motor is shut off from rotation in the opposite direction, by throwing the switch arm to a neutral position with a corresponding movement of the rod 16, when the tire reaches a predetermined position relative to the front roll of the mill.

This position is such that the tire is flattened in cross section somewhat where it engages the roll, as shown in Figs. 6 and 8. The extent of this flattening is accurately determined for tires of different sizes and according to what experience has shown to be correct by means of a finger 30 associated with the collar 29 nearest the mill for reading against a chart fastened on a fixed vertical board 31, the chart being figured to take care of the size range of all tires.

Slidably keyed on the shaft 5 is a collar 32 having a plurality of lugs 33 projecting radially therefrom. Spaced circumferentially about a drum 34 fixed with the chuck device are holders 35 to removably support lugs 36 which extend radially from the back of the drum in the direction of the axis thereof. The lugs 33 are normally clear of the path of movement of the lugs 36 with relation to the rotation of the tire and its supporting structure. Said lugs however are adapted to be moved into such path by suitable means such as an air cylinder and piston unit 37.

Extending under the rolls of the mill parallel to the shaft 5 and supported from the adjacent frame 1 is a shaft 38. A clutch element 39 is splined on the shaft, which element is adapted to engage a cooperating element 40 fixed in connection with a chain drive 41 by which driving engagement with the adjacent end of the shaft 5 is had. At its opposite end the shaft 38 is geared to a shaft 42 extending parallel to the rolls and disposed back of the front roll. Said shaft intermediate its ends but near the left hand end is formed with lengths of right and left hand threads as shown at 43. The opposite end of the shaft has gear connection with a hand operated shaft 44 extending to the front of the mill.

Mounted intermediate its ends on the threaded portions of the shaft 42 are arms 45 extending forwardly under the front roll 2. Each arm at its front end carries a pair of upwardly projecting cutter elements 46 spaced lengthwise of the roll and adapted to normally engage the under face of the same adjacent its bottom central plane. When these elements are engaged with the roll they cut two narrow strips N of rubber from the bulk of rubber R disposed about the roll and leave a central wide strip S of the width desired for application to the tire.

Cooperating scale and pointer elements 47 and 48 respectively are mounted in connection with the cutter supporting arms so that said cutters may be initially set to the desired accurate spacing by manipulation of the hand shaft 44.

Supported from the upper ends of the arms 45 in front of the same and of the cutters and in forwardly and downwardly angled relation to the latter are rollers 49, of convex longitudinal curvature. These rollers are adapted to engage with the strips N so as to enable such strips to be deflected from their original positions on the roll and from the central strip S as the latter moves up from underneath for engagement with the tire. These strips N after being initially formed for a certain length by the rotation of the rolls are caught and pulled out by the operator and engaged with the rollers. The portions of said strips above the rollers are severed from the mass of rubber and are re-engaged with the main portion of the rubber to the sides of the main strip. With the further rotation of the rolls therefore said narrow strips as they are formed by the cutters will be continuously engaged by the rollers and will be maintained deflected, so as to be clear of the plane of contact of the tire with the roll, and thus insuring that no rubber to the sides of the main strip S can be engaged with the tire; since the roll is uncovered and clean for a certain distance on each side of the main strip.

The clutch element 39 is shifted into engagement with the element 40 at will by suitably manually controlled means so as to be driven by the shaft 5; the direction of cut of the treads 43 being such that with the rotation of the shaft 5 in a tire retracting direction, the arms 45 and the cutters 46 will be moved toward each other.

Mounted on the base of the mill between the frames 1 and at the front of and below the front roll 2 is a cylindrical casing 50. This casing is positioned in alinement with the strip between the cutters and its length is greater than any spacing to which the cutters may be adjusted. A thin rubber deflecting blade 51 is disposed lengthwise of and above the casing, being connected to the adjacent end of a length of flexible material 52. This material projects through a longitudinal slot in the front side of the casing and is rolled about a spring actuated core 53 in the casing and of substantially the same construction as employed in the ordinary shade roller, or so that the material will be normally wound about the core and the blade held adjacent the casing. A handle 54 projects from the right hand end of the blade so that it may be easily pulled up against the resistance of the spring core.

The tire to which the tread is to be applied is first subjected to the action of a buffing machine to remove the old tread rubber, and expose the fabric, so that a roughened surface to which the new rubber readily adheres without the need of cement, is provided.

In operation a mass of cushion rubber sufficient for one wrapping about the tire is first placed in the mill so as to be rolled in a plane between the gauge plates 3. At the same time if desired a mass of tread rubber R may be placed in the mill to the side of the side of the cushion rubber so as to be rolled without mixing with the cushion stock. The tire 20 to be worked on, which has been already heated in a suitable enclosure, is then mounted on the rim as previously described and the bag 21 is filled with air under pressure and maintained under pressure until the completion of the rubber wrapping operations. The rolls are set to the desired spacing and one stop 29 is set so that the advance of the tire will be halted when it has engaged the front roll 2 and has been flattened a predetermined extent as determined by the chart on the board 31 and according to the size of the particular tire.

The switch of the motor 10 is then closed by manually pulling the rod 16 in the direction away from the mill, when the accompanying operation of the motor and the rotation of the screw shaft 5 advances the tire and its supporting structure as a unit. When the finger 28 on the cross head 17 engages the stop 29 nearest the mill and pulls the rod 16 to a switch opening position, it stops the motor and the advance of the tire. The tire is then compressed and flattened where it engages the roll for a width at least equal to that of the strip to be applied. Such engagement also causes the tire to be rotated by reason of its contact with the roll and the rubber strip to be transferred from the roll onto the tire, the strip being severed on the roll at this point.

In the meantime the gauge plates 3 have been set to the desired spacing and depressed into contact with the rolls. The strip as applied to the tire will thus be of an even and desired width. At the initial point of contact of the tire with the roll, a chalk or other mark M as indicated in Figs. 6 and 7 is made on the side of the tire, this mark serving as a gauge for the wrapping of the rubber thereabout. As the wrapping of rubber one complete turn about the tire approaches the starting point the operator raises the blade 51 and places the same against the face of the tire in alinement with the mark M, and so that it is between the tire and the rubber being stripped from the roll. As the rubber from the roll reaches the starting point on the tire the operator throws the rod 16 so that the motor is started in the reverse direction, causing the tire to back away from the roll and giving room for the blade to be manipulated to sever the rubber between the tire and roll so that no more than necessary will be engaged with the tire.

The blade is then allowed to drop to its normal resting place adjacent the casing 50 by the pull of the length of the material 52 thereon. It is to be understood that an exact termination of the wrapping is not absolutely necessary, nor is a neat finish, since this wrapping is later covered with the tread rubber and is never seen and in any event the finish is produced by the matrix in the retreading mold in which the tire is subsequently placed.

During the above operations the pins 33 are held from the path of the lugs 36; and the clutch elements 39 and 40 remain disengaged. Also the cutters 46 are lowered from the roll, since these cutters have nothing to do with the placing of the cushion strip on the tire.

With the reverse operation of the motor, as above described, the tire continues to back away from the roll until the finger 28 engages the adjacent stop 39 and pushes the rod 16 so that the operation of the motor is halted. The gauge plates 3 are then lifted clear of the rolls and the remaining cushion rubber is stripped from the rolls while the tread rubber is allowed to take its place, the rolls rotating continuously. The cutters 46 are then spaced by hand to give the strip S the desired width between the cutters.

The cutters are moved into engagement with the roll and with the rotation of the latter, the narrow strips N as formed from the mass of rubber passing about the roll between the pairs of cutters are caught and deflected over the rollers 49 as previously described. This leaves the wide strip of rubber S with clean cut edges and with uncovered clean portions of the roll to the sides of the strip so that there is no chance of any rubber other than that of the strip itself engaging and adhering to the tire.

These operations being completed—and which only consume a very short time—the motor 10 is started by manual operation of the rod 16 in a tire advancing direction until such advancing movement is halted as before by the engagement of the finger 28 with the stops 29, whereupon the tire as before rotates by contact with the roll 2. The wrapping of the tread rubber strip about the tire in superimposed relation to the cushion wrapping thereon immediately begins, the original mark M or a new one being used to denote the starting point of such wrappings.

At the same time, the pressure in the tire is reduced somewhat by manipulation of the valve 25 so as to prevent the still soft cushion strip from being subjected to such pressure as would cause it to be possibly squeezed out of place laterally.

Simultaneously with the starting of the wrapping operation the operator causes the connection between the motor 10 and the shaft 5 to be broken, the lugs 33 to be moved into the path of movement of the lugs 36, and the clutch elements 39 and 40 to be engaged. The shaft 42 will thus be rotated as the shaft 5 rotates, which as before stated will cause the cutters to be moved along said shaft 42 in one direction or the other. Such rotation is intermittently imparted to the shaft 5 a certain number of times with each full revolution of the tire according to the number of lugs 36 on the drum 34, as said lugs engage and push past the lugs 33 successively and thus rotate the collar 32 and the shaft 5 to which said collar is keyed.

The direction of rotation of the shaft 5 thus had relative to the direction of cut of the screw threads 43 on the shaft 42 is such that the cutters 46 are moved closer together.

As a result the strip S is gradually lessened in width as the wraps about the tire increase so that as the wraps are completed the cross sectional form of the rubber thus applied approximates that of the finished tread, as shown in Fig. 9. The extent to which the widening of the strips is thus lessened and consequently the degree of side slope of the built up rubber on the tire, depends of course on the number of lugs 36 used, since obviously the more lugs there are the more times will turning movements be imparted to the collar 32 with each full revolution of the tire. Also, with such rotation of the shaft 5 the tire is intermittently backed up slightly from the roll or sufficient to counteract for the thickness of the rubber being added and to only maintain the tire flattened for a width equal to that of the rubber strip being applied at that time.

When the final wrap is about completed the operator again deflects and severs the rubber passing from the roll onto the tire by the use of the blade 51 as before. At about the same time the driving engagement between the motor 10 and shaft 5 is re-established. This enables the tire to be retracted upon the motor switch being again closed by hand as was done after the cushion-strip wrapping operation.

After the full retraction of the tire and the resultant halting of the motor the tire and bag are removed from the chuck. The tire may be then immediately placed in a mold and vulcanized to provide the finished and cured retread.

I have found that by the use of my improved method as herein disclosed, I am enabled to cause the tread rubber to effectively adhere to the tire without the use of applying an independent coating of rubber cement between the rubber and the tire. This eliminates the cost of cement and the cost of labor for applying the same, thus materially reducing the ultimate cost of the tread applying operations.

From the foregoing description it will be readily seen that I have produced such a method as substantially fulfills the objects of the invention as set forth herein.

Having thus described my invention what I claim as new and useful and desire to secure by Letters Patent is:

1. The method of applying tread rubber to a pneumatic tire from a roll, consisting in forcing a tire free to rotate against the roll with a pressure sufficient to flatten the tire transversely to a predetermined extent, maintaining the tire under a predetermined internal pressure while it is thus held flattened, and forming a strip of rubber on the roll for engagement with said flattened portion.

2. The method of applying tread rubber to a pneumatic tire from a roll consisting in inflating the tire, holding the tire against the roll while permitting the tire to rotate with the roll, forming a strip of rubber on the roll with the rotation thereof in the lateral plane of the tire for wrapping engagement therewith, causing such wrapping to take place, lessening the width of the strip at intervals as the wrappings become superimposed on each other, and retracting the tire from the roll to a predetermined extent coincident with each width-lessening operation.

3. The method of applying tread rubber to a pneumatic tire from a roll consisting in inflating the tire, holding the tire against the roll while permitting the tire to rotate with the roll, forming a strip of rubber on the roll with the rotation thereof in the lateral plane of the tire for wrapping engagement therewith, causing such wrapping to take place, and retracting the tire from the roll a predetermined extent with the superimposing of successive wrappings of the strip on the tire.

4. The method of applying tread rubber to a pneumatic tire from a roll, consisting in forcing a tire free to rotate against the roll with a pressure sufficient to flatten the tire transversely to a predetermined extent, maintaining the tire under a predetermined internal pressure while it is thus held flattened, forming a strip of rubber on the roll the width of said flattened portion for direct engagement therewith, gradually lessening the width of the strip as it is wrapped about the tire, and coincidently retracting the tire from the roll to an extent sufficient to maintain the width of the flattened portion substantially equal to the width of the strip.

5. The method of applying tread rubber to a pneumatic tire from a roll, consisting in inflating the tire, and forcing the tire while still free to rotate, against the rubber on the roll, with a pressure sufficient to flatten the tire transversely to a predetermined extent and thus cause the rubber to be applied against and adhered to the tire with equal pressure throughout the width of the flattened portion.

6. The method of applying tread rubber to a tire from a sheet on a roll consisting in rotatably engaging the tire with the roll, cutting a strip from the sheet in the lateral plane of and for application to the tire with the rotation of the roll, placing a separating element against the tire and between the strip and the tire at the point of beginning of the wrap to prevent further wrapping after the strip has reached the point of beginning of the wrap, and severing the strip at such point.

7. The method of applying rubber about a pneumatic tire comprising flattening the tire for a limited area of its circumference and width progressively, and applying a strip of rubber to said area as it is formed.

8. The method of applying rubber about a pneumatic tire comprising flattening the tire for a limited area of its circumference and width progressively, and applying a strip of rubber to said area as it is formed, and against the resistance of a predetermined pressure.

9. The method of applying rubber about a pneumatic tire comprising flattening the tire for a limited area of its circumference and width progressively, and applying a strip of rubber to said area as it is progressively formed, and so as to extend completely about the tire in the form of a number of wrappings, and reducing the extent of flattening with the successive wrappings.

10. The method of building up a tread on a tire carcass comprising forcing the tire against a roll with a predetermined initial pressure, rotating the roll and tire, feeding a strip of cushion stock between the roll and tire so that said strip will adhere to and extend about the tire with the rotation thereof, reducing the pressure between the roll and tire, and feeding a strip of tread rubber between the roll and tire for adhesion to the cushion strip.

11. The method of building up a tread on a tire consisting in holding the tire while free to rotate against a rotating roll of a mill, rolling cushion stock in the mill and applying it to the tire, simultaneously rolling cushion stock in the mill, while maintaining the same clear of the cushion stock and carcass, backing the tire away from the roll after the cushion stock is applied, stripping the remaining cushion stock from the mill, shifting the rolled tread stock in the mill to take its place, and again advancing the tire against the roll to cause the tread stock to be applied about the tire in contact with the cushion stock thereon.

12. The method of building up a tread on a tire consisting in simultaneously rolling masses of cushion and tread stock rubber in a mill, maintaining the stocks separated, and successively advancing a tire against a roll of the mill to contact the rolled cushion and tread stocks in the proper sequence.

13. That method of applying rubber to a tire carcass formed into a finished tire of substantially circular cross section, comprising the steps of applying a yieldable pressure to the interior of the carcass, flattening the curved tread of the carcass against said pressure progressively around the entire periphery of the carcass, pressing rubber onto the carcass in the plane of the flattened portion, and continuing such application of rubber until the latter is built up to a desired thickness.

14. That method of applying rubber to a tire carcass formed into a finished tire of substantially circular cross section, comprising the steps of applying a yieldable pressure to the interior of the carcass, rotating the carcass, flattening the curved tread of the carcass against such internal pressure at a point in its circle of rotation, then pressing rubber onto the carcass in the plane of the flattened portion thereof and continuing such application of rubber until the latter is built up on the carcass to a desired thickness.

15. That method of applying rubber to a tire carcass formed into a finished tire of substantially circular cross section consisting in the steps of first applying a yieldable pressure to the interior of the carcass, moving the carcass under such pressure against a roll until the curved tread of the tire is flattened in the plane of its engagement with the roll, forming a strip of rubber on the roll, and transferring such strip of rubber from the roll to the carcass at the point of contact between the carcass and roll.

16. That method of applying rubber to a pneumatic tire carcass consisting in the steps of first applying a yieldable pressure to the interior of the carcass, moving the carcass under such pressure against a roll until the face of the tire is flattened in the plane of its engagement with the roll, forming a strip of rubber on the roll, transferring such strip of rubber from the roll to the carcass at the point of contact between the carcass and roll, and gradually retracting the tire from the roll as the transferred strip of rubber builds up on the tire.

17. That method of applying a strip of rubber, which is initially substantially flat in cross section, about the tread of a tire carcass which is initially substantially circular in cross section, which method comprises the steps of temporarily flattening the circular tread of the carcass to cause it to substantially conform to the flat of the strip, and applying the flat strip to the tread of the carcass while the latter is in its temporarily flattened form.

HERBERT J. WOOCK.